United States Patent Office 3,381,058
Patented Apr. 30, 1968

3,381,058
POLY(1,4-CYCLOHEXYLENEDIMETHYLENE TEREPHTHALATE) FIBER HAVING NONFIBER-FORMING POLYESTER DISPERSED THEREIN
John R. Caldwell and Edward H. Hill, Kingsport, Tenn., assignors to Eastman Kodak Company, Rochester, N.Y., a corporation of New Jersey
No Drawing. Continuation of application Ser. No. 78,303, Dec. 27, 1960. This application Aug. 26, 1966, Ser. No. 575,472
1 Claim. (Cl. 260—860)

ABSTRACT OF THE DISCLOSURE

Dyeability of synthetic fibers is enhanced by the incorporation therein of nonfiber-forming polyesters having a molecular weight of from 1500 to 5000. The polyesters are condensation products of a dihydric alcohol and an aromatic dicarboxylic acid having free hydroxyl groups. For example, the dyeability of poly(1,4-cyclohexylenedimethylene terephthalate is enhanced by including therein from about 3 to 30% by weight of a polyester of 1,4-cyclohexanedimethanol and 5-hydroxyisophthalic acid.

---

This application is a continuation of application Ser. No. 78,303 filed Dec. 27, 1960.

This invention relates to synthetic textile fibers and more particularly to a means of rendering certain types of such fibers not heretofore susceptible of dyeing with basic and cotton dyes capable of being satisfactorily dyed with these classes of dyes. The invention is especially concerned with a new type of polyester mordant or dye absorber derived from hydroxyaromatic dicarboxylic acids and polyhydric alcohols.

It is known that various types of synthetic textile fibers such as those composed of cellulose acetate of the acetone soluble variety, cellulose triacetate, acrylonitrile polymers, polyesters, polyamides or polyhydrocarbon polymers cannot be satisfactorily dyed with basic dyes nor with cotton dyes. This is due to the fact that these polymeric fibers are of such chemical constitution that they do not offer an affinity for the dye because there is no opportunity for chemical union between the dye and the fiber material. Because of this lack of affinity it has been extremely difficult, if not impossible, to dye fibers composed of such materials as secondary cellulose acetate, cellulose triacetate, polyacrylonitrile, high melting crystalline polyesters, polyamides and polyhydrocarbon polymers such as polyethylene and polypropylene with such basic dyes since there is at best only a superficial penetration of the dye into the fiber without chemical combination. The result has been that such fibers, either will not take the dye at all or will lose the dye in the course of the various textile processing steps to which the dyed fibers are subjected in the customary textile processing operation.

It is accordingly an object of this invention to provide a means of dyeing synthetic fibers of cellulose acetate of the acetone soluble variety, cellulose triacetate, acrylonitrile polymers, polyesters, polyamides or hydrocarbon polymers such as polyethylene and polypropylene with basic dyes.

Another object of the invention is to provide a new type of dye mordanting agent which when added to such fibers will render them susceptible of being satisfactorily and permanently dyed with basic dyes.

Another object of the invention is to provide polymeric organic mordanting agents or dye absorbers which are compatible with various types of polymeric fiber forming materials, particularly such materials as acetone soluble cellulose acetate, cellulose triacetate, acrylonitrile polymers, polyesters, polyamides and polyhydrocarbon polymers and of such viscosity characteristics and compatibility with the fiber forming material that they may be readily incorporated in and mixed with the polymeric material without excessive separation into phases.

Another object of the invention is to provide new linear polyesters of relatively low melting point from hydroxy aromatic dicarboxylic acids and polyhydric alcohols which are useful as mordants or dye absorbers in rendering fibers composed of cellulose acetate of the acetone soluble variety, cellulose triacetate, acrylonitrile polymers, polyesters, polyamides or polyhydrocarbon polymers such as polyethylene and polypropylene, susceptible of dyeing with basic dyes.

Another object of the invention is to provide a means of facilitating the dyeing of such fibers with cotton dyes.

Another object is to provide improved textile and other fibers and related products composed of cellulose acetate, cellulose triacetate, acrylonitrile polymers, polyesters, polyamides or polyhydrocarbon polymers such as polyethylene and polypropylene dyed with basic dyes or cotton dyes.

Other objects will appear hereinafter.

These and other objects of the invention are accomplished, according to one embodiment thereof, by reacting to form a linear polyester, a polyhydric alcohol and a hydroxy aromatic dibasic acid containing at least 1 and not more than 2 aromatic nuclei and having two carboxylic groups joined directly to the aromatic nuclei and having one or two phenolic hydroxyl groups present in the molecule.

The polymeric polyesters employed in the practice of this invention are conveniently prepared by heating a mixture of the polyhydric alcohol and a hydroxy aromatic dibasic acid as herein defined, either free or esterified, at atmospheric pressure, and preferably in the presence of a suitable condensation catalyst such as an amphoteric metal compound. Any of the known polyesterification catalysts such as titanium alkoxides, titanium alkoxide complexes with sodium, lithium, and magnesium may be used. Lead, tin, and zinc compounds may be employed. From 0.005% to 0.1% and preferably 0.008% to 0.05% of the metal is used based on the weight of the reactants.

The first stage of the reaction is carried out at a temperature of 150° to 300° C., preferably from about 200° to 250° C., at atmospheric pressure and preferably in the presence of dry nitrogen in order to distill the alcohol formed by the ester interchange and produce low molecular weight glycol esters. The temperature is then raised to 250° C. to 300° C. or thereabout, depending on the melting point of the polyester. The final phase of the reaction is carried out under vacuum with good agitation in order to facilitate the escape of volatile products from the viscous melt and is continued until the product has a molecular weight of 1500–5000. The polyester products at this final stage will have an intrinsic viscosity of less than .2, the intrinsic viscosity being defined as $$\frac{\log_e N_r}{C}$$

in which $N_r$ is the viscosity of a dilute solution of the polymer in m-cresol divided by the viscosity of m-cresol in the same units and at the same temperature, and C is the concentration in grams of polymer per 100 cc. of solution. Measurement of the intrinsic viscosity is generally the most convenient method for following the course of the reaction. The polymer thus obtained is not a fiber-forming composition as its viscosity and melting point are too low to give it the required tensile strength for this purpose.

Polyesters having a molecular weight of about 1500–3000 can be made merely by heating the acid with the glycol and the use of a vacuum is not necessary.

In practicing the invention any of the hydroxy aromatic dibasic acids as defined herein can be used to prepared the polyesters embodying this invention. Thus, the hydroxy acids can be those containing a single aromatic nucleus bearing two carboxylic groups and 1 or 2 hydroxylic groups such as the phthalic acids of the formula $$R'OOC\text{-}Ar(OH)\text{-}COOR'$$

in which each R' is either hydrogen or an alkyl group, preferably of 1 to 4 carbon atoms; or the hydroxy aromatic dibasic acids can be those containing two or more unfused aromatic nuclei with a carboxylic group joined to each terminal nucleus and one phenolic hydroxyl group on at least one of the nuclei bearing a carboxylic group. These hydroxy acids thus have the formula $$R'OOC\text{-}Ar(OH)_z\text{-}X\text{-}Ar(OH)_y\text{-}COOR'$$

wherein $y$ and $z$ are either 0 or 1, one of $y$ and $z$ being 1, and X is either a direct bond between the two benzene rings or a hydrocarbon radical of 1–6 carbon atoms such as $$-CH_2-,\ -CH_2-CH_2-,\ -CH(CH_3)-CH_2-,\ -CH(CH_3)-,\ -C_6H_5$$

or a divalent radical selected from the group consisting of $$-O-,\ -O-CH_2-CH_2-O-,\ -SO_2-,\ -S-,\ -N(CH_3)-,\ or\ CF_2-$$

In these hydroxy acids, the carboxylic groups are either meta or para to the linking group X, while the hydroxyl groups can be located in any open position including positions ortho, meta or para to the carboxyl group.

The aromatic hydroxy acids employed in practicing the invention are typified by, but not limited to, mononuclear monohydroxy dibasic acids of the formula $$R'OOC\text{-}Ar(OH)\text{-}COOR'$$

such as 2-hydroxy-terephthalic acid, 5-hydroxy-isophthalic acid, 6-hydroxy-isophthalic acid, 3-hydroxy-o-phthalic acid 4-hydroxy-o-phthalic acid and esters of these or similar hydroxy acids; dinuclear dihydroxy dibasic acids of the formula $$R'OOC\text{-}Ar(OH)_z\text{-}[(CH_2)_m\text{-}(CHR)_n]_x\text{-}Ar(OH)_y\text{-}COOR'$$

in which $m$, $n$, $x$, $y$ and $z$ are either 0 or 1, one of $y$ and $z$ being 1, and in which R is either hydrogen or a methyl group, such as 4,4'-dicarboxy-2,2'-dihydroxy-diphenyl methane, 4,4'-dicarboxy-2,2'-dihydroxy-diphenyl ethane 4,4'-dicarboxy-2,2'-dihydroxy-diphenyl methyl methane, 4,4'-dicarboxy-3,3'-dihydroxy diphenyl methyl ethane, and esters of these and similar dicarboxy hydroxy diphenyl alkanes; dicarboxy hydroxy diphenyl sulfones of the formula $$R'OOC\text{-}Ar(OH)_z\text{-}SO_2\text{-}Ar(OH)_y\text{-}COOR'$$

such as 3,3'-dicarboxy-4,4'-dihydroxy-diphenyl sulfone, 4,4'-dicarboxy-3,3'-dihydroxy-diphenyl sulfone, and esters of these and similar sulfone dibasic hydroxy acids, dicarboxy hydroxy diphenyl sulfides of the formula $$R'OOC\text{-}Ar(OH)_z\text{-}S\text{-}Ar(OH)_y\text{-}COOR'$$

such as 3,3'-dicarboxy-4,4'-dihydroxy-diphenyl sulfide, 4,4'-dicarboxy-3,3'-dihydroxy-diphenyl sulfide, 4,4'-dicarboxy-2,2'-dihydroxy-diphenyl sulfides, and esters of these and similar dibasic hydroxy sulfides; dicarboxy hydroxy diphenyls of the formula $$R'OOC\text{-}Ar(OH)_z\text{-}Ar(OH)_y\text{-}COOR'$$

such as 4,4'-dicarboxy-3,3'-dihydroxy diphenyl ether and esters of this and similar dicarboxy hydroxy diphenyl ethers; as well as compounds of the formula $$R'OOC\text{-}Ar(OH)_z\text{-}O\text{-}CH_2\text{-}CH_2\text{-}O\text{-}Ar(OH)_y\text{-}COOR'$$

$$R'OOC\text{-}Ar(OH)_z\text{-}Ar\text{-}Ar(OH)_y\text{-}COOR'$$

$$R'OOC\text{-}Ar(OH)_z\text{-}N(CH_3)\text{-}Ar(OH)_y\text{-}COOR'$$

and $$R'OOC\text{-}Ar(OH)_z\text{-}CF_2\text{-}Ar(OH)_y\text{-}COOR'$$

$y$, $z$ and R' having the values assigned hereinabove. In each of these groups, the carboxylic radicals can be in the 3,3' and 4',4'-positions, and the hydroxyl groups can be in any of the 2,2', 3,3', 4 or 4' positions which are otherwise unsubstituted.

Another useful class of aromatic dicarboxylic hydroxy acids contains fused rings, as found in naphthalene, for example. Typical examples of such acids are:

5-hydroxy-2,3-napthalene-dicarboxylic acid, 1,5-dihydroxy-2,6-naphthalene dicarboxylic acid and

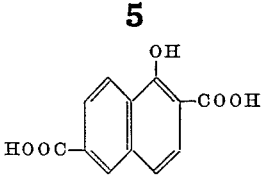

1-hydroxy-2,6-naphthalene dicarboxylic acid.

Especially useful acids for preparation of the polyesters of this invention are aromatic hydroxy dicarboxylic acids selected from the group of compounds of the formulas:

(a) 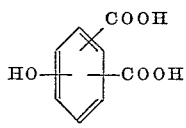

(b) 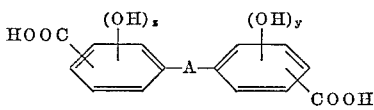

Where A is selected from the group consisting of $$-CH_2-,\ -SO_2-$$

and $-O-$, and where $y$ and $z$ are selected from the group consisting of zero and one, at least one of $y$ and $z$ being one.

(c) 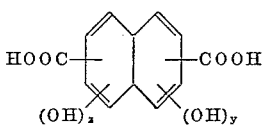

Where $z$ and $y$ are selected from the group consisting of zero and one, and one of $y$ and $z$ being one, said polyester having a molecular weight of approximately 1,500–5,000.

Of particular value in preparing polyesters according to the invention are the aromatic hydroxy dicarboxylic acids of groups (a) and (b) above, especially 4-hydroxyisophthalic acid when employed to produce a linear polyester of the herein described mordanting properties when reacted with 1,4 cyclohexanedimethanol.

In practicing the invention, the hydroxy acid is reacted with a polyhydric alcohol, desirably in the presence of a condensation catalyst and preferably an organo-metallic catalyst, a large number of which are described in U.S. Patents 2,744,089–2,744,098, inclusive, and U.S. Patent 2,744,129. The catalysts which are preferred for use in practicing this invention are the tin compounds as described in U.S. Patent 2,720,507, and aluminum compounds as disclosed in U.S. Patent 2,720,506. When such catalysts are employed in preparing the polyester, the esterified polybasic acid can be readily used instead of the free acids. It will, therefore, be understood that this invention includes the use of such acids in the form of their esters as well as in the unesterified form, and includes the use of any condensation catalyst or no catalyst in accordance with usual practices.

The polyhydric alcohols which may be employed may be generally represented by the formula:

$$HO-X'-OH$$

wherein X' is (a) a straight chain, branched chain and cyclic alkylene radical containing from 2 to 12 carbon atoms,
(b) a group having the structure $$-(-C_2H_4O)_n-C_2H_4-$$

where $n$ is 1 to 3.
(c) the group

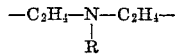

wherein R is a lower alkyl group of 1–4 carbon atoms or phenyl
(d) is the group

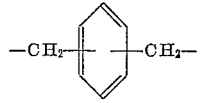

The polyhydric alcohol is preferably an alpha, omega dioxy compound having the formula $$HO-(CH_2)_p-OH$$

wherein $p$ is an integer of from 2 to 12 inclusive. The polyhydric alcohols which are preferably employed in practicing the invention are the glycols which are commonly used in the preparation of polyesters such as ethylene glycol, trimethylene glycol, tetramethylene glycol, pentamethylene glycol, hexamethylene glycol, heptamethylene glycol, octamethylene glycol and 2,2-dimethylpropanediol-1,3. Other glycols which are suitable include the ether glycols such as diethylene glycol.

Glycols containing tertiary amino groups may also be used, as represented by N-phenyldiethanolamine and N-methyldiethanolamine. Polymers made from these amino glycols are mordants for both acidic dyes and basic dyes.

In addition glycols that contain alicyclic structures are suitable, as represented by 1, 1-, 1,2-, 1,3 and 1,4- cyclohexanedimethanol, quinitol, 1,3 dihydroxycyclopentane and 3-cyclohexane-1,1-dimethanol. Also glycols containing an aromatic nucleus such as the xylylene glycols may be used. Such glycols are represented by the structural formula

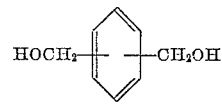

Typical glycols of this latter class are the o-, m-, and p-xylylene glycols.

The polyhydric alcohol is desirably employed in an amount such that there is an excess of hydroxy radicals over the amount of carboxyl groups in the polybasic acid or esters employed in the reaction. Generally speaking, the hydroxyl groups are desirably present in an amount of from about 1.3 to about 3 times the amount of carboxyl groups, although excess amounts of as much as 10 times or more can be employed in some cases.

When polyesters are prepared in accordance with this invention, the reaction is desirably affected under an inert atmosphere, and preferably under anhydrous conditions. The initial reaction is effected at atmospheric pressure, and at an elevated temperature for a period of about 1 hour. Thereafter it is usually desirable to reduce the pressure on the reaction mixture to below about 15 mm. Hg and to raise the temperature of the reaction mixture for a period of from 0.2 to 1.0 hour. This permits any alcohol or other volatile material to distill out of the highly viscous polymer melt.

The polymers prepared as described above can, in accordance with the invention, be readily incorporated with fiber-forming polymers which, although poorly or not at all dyed by basic dyes, are thus rendered susceptible of satisfactory dyeing because of the fact that the added polyester material acts as a dye absorber or mordant and forms sites throughout the fiber-forming polymer material to which it is added which can readily take up and hold the dye.

The polyester material, because of its solubility in a wide range of solvents for fiber-forming polymers, such as acetone, methylene chloride, dimethyl formamide, and various alcohols and esters, can be readily dissolved into a dope or solution in such solvents of a fiber-forming polymer and the resulting solution dry or wet spun by known methods to produce fibers of the blended polymers which will dye well with basic dyes.

Likewise, a suspension of the polyester particles may be slurried onto particles of a fiber-forming polymer, the solvent or slurry medium evaporated and the resulting particles melt-spun into fibers in accordance with well known melt spinning methods. Such fibers can be readily dyed with basic dyes.

In another variation of the process, a solution of the polyester in a volatile solvent is stirred with particles of the fiber-forming polymer while the solvent is evaporated. This treatment leaves a coating of the polyester on the polymer particles which can then be melted and spun into fibers which also dye well with basic dyes.

Alternatively, the polyester can be mixed with the fiber-forming polymer by means of a mill or hot rolls. In this process, the polyester is broken up into small particles that become dispersed throughout the mass of the fiber-forming polymer. This mixed polymer mass can then be melt spun to produce fibers readily dyeable with basic dyes.

In producing dyeable fibers by the above described procedures in accordance with the invention from 3% to 30% and preferably 5% to 15% of the polyester is used, based on the weight of the fiber. As indicated above the ultimate fiber may be formed from a mixture or blend of fiber-forming polymer and polyester modifier by dry spinning, wet spinning or melt spinning.

The invention is further illustrated by the following examples of certain preferred embodiments thereof which are included merely for purposes of illustration and are not intended to limit the scope of the invention.

Example 1

A mixture of 10.8 g. of 5-hydroxyisophthalic acid and 9 g. of butanediol was placed in a reaction vessel equipped with a stirrer, a short distillation column, and an inlet for dry, purified nitrogen. A solution of 0.0005 g. of dibutyl diphenyl tin in ethyl alcohol was added as a catalyst. While maintaining an atmosphere of nitrogen, the mixture was stirred at 170–180° for 2 hours, then at 200° for 1 hour. The temperature was then raised to 250° and maintained for 20 minutes. At this time a vacuum of 0.1 mm. was applied for 25 minutes and the melt was poured out to cool. A hard, light brown resin was obtained.

Ten parts of the polymer prepared as described above was dissolved in methylene chloride and mixed with 90 parts of cellulose triacetate (acetyl value 44%) in methylene chloride. This dope was dry spun to give test fibers which dyed heavily with basic dyes such as Maxilong Blue RLA and Severon Brilliant Red 4G.

Example 2

A polyester was prepared from 5-hydroxyterephthalic acid and 1,4-cyclohexanedimethanol. One hundred and 82 g. of 5-hydroxyterephthalic acid and 144 g. of 1,4-cyclohexanedimethanol were placed in a flask equipped with a stirrer and distillation column. Dibutyltin oxide (9.5 g.) was added as catalyst and the mixture was stirred in an atmosphere of nitrogen at 160–180° for 2 hour,s then at 200–220° for 4 hours, and finally at 240° for 3 hours. Water was allowed to distill during the entire reaction time. The product was a brittle glass when cool. It had a molecular weight of about 3000. Twenty parts of the polymer were dissolved in methylene chloride and slurried with 80 parts of powdered polyethylene terephthalate. The solvent was then evaporated and the mixed polymers were melt spun into fibers which dyed well with basic dyes.

Example 3

A polyester was prepared from 5,5'-methylenedisalicylic and p-xylene glycol. Two hundred and 88 g. of 5,5'-methylendisalicylic acid and 160 g. of p-xylene glycol were placed in a flask equipped with a stirrer. Dibutyltin diacetate (0.5 g.) was added as catalyst. The mixture was stirred at 160–180° for 2 hours, then at 200–220° for 2 hours. The temperature was raised to 240° and a vacuum of 0.1–0.5 mm. was applied. Stirring under vacuum was continued for 15 minutes. The product was a brittle glass at room temperature. Ten parts of the polymer were dissolved in dimethylformamide and mixed with 90 parts of polyacrylonitrile in dimethylformamide. Fibers were wet-spun from this dope which had a strong affinity for basic dyes.

Example 4

A copolyester was prepared according to the procedure described in Example 1 employing the folowing materials:

| | G. |
|---|---|
| 5-hydroxyisophthalic acid | 10.8 |
| Butanediol | 4.5 |
| Bis (2-hydroxyethyl)isophthalamide | 26 |

Twenty parts of the polymer obtained was dissolved in methylene chloride and mixed with a solution 80 parts of cellulose acetate (38% acetyl) in acetone. Fibers were dry-spun from this mixed dope which dyed well with basic dyes, premetallized dyes, and acetate dyes.

Example 5

Using the method describing in Example 1 a polyester was prepared from 2,2 - dimethyl - 1,3 - propanediol and 4,4 - dihydroxy - 2,2' - sulfonyldibenzoic acid. The polymer was dissolved in acetic acid and mixed with a dope of cellulose triacetate in acetic acid to give a composition of 88 parts cellulose acetate—12 parts polyester. Fibers were wet-spun from the mixed dope which dyed well with basic dyes and with acetate dyes.

Example 6

Ten parts of the polyester prepared in Example 1 was dissolved in methylene chloride and mixed with 90 parts of finely ground polyethylene to form a slurry. The methylene chloride was then evaporated. The dry, modified polyethylene was melt-spun into fibers which dyed well with basic dyes.

Example 7

Ten parts of the polyester prepared in Example 1 was dissolved in methylene chloride and mixed with 90 parts of finely ground polypropylene to form a slurry. The methylene chloride was then evaporated. The dry, modified polypropylene was melt-spun into fibers which had a strong affinity for basic dyes.

Example 8

Using the method described in Example 1 a polyester was prepared from 10.8 g. of 5 - hydroxyisophthalic acid and 11.8 g. of methyl diethanolamine. Fifteen parts of the polyester was dissolved in dimethylformamide and mixed with 85 parts of poly(94 - acrylonitrile - 6 - methyl acrylate) in dimethylformamide. The dope was wet-spun into fibers which dyed deeply with acid wool dyes and basic dyes.

Example 9

Using the procedure described in Example 1, a polyester was made from 1 - hydroxy - 2,6 - naphthalenedicarboxylic acid and diethylene glycol. The polymer was soluble in methylene chloride and chloroform. Ten g. of the polyester was dissolved on 150 cc. of methylene chloride and the solution was poured onto 70 g. of crystalline polystyrene which had a particle size of 100–150 mesh. The slurry was agitated while the methylene chloride was evaporated and a coating of the polyester was formed on the surface of the polystyrene particles. The coated polystyrene was melt-spun by the usual method. The fiber dyed well with basic dyes.

Example 10

Ten g. of the polyester described in Example 2 was dissolved in 60 cc. of methylene chloride and slurried with 90 g. of a polyester made from terephthalic acid and 1,4 - cyclohexanedimethanol. The solvent was evaporated and the mixed esters were melt spun. The fibers dyed well with basic dyes.

Example 11

Using the procedure described in Example 1, a polyester was made from 4,4 - dicarboxy - 3,3' - dihydroxydiphenyl ether and decamethylene glycol. Ten g. of the polymer was dissolved in 100 cc. of chloroform and the solution was slurried on 90 g. of crystalline poly(4 - methylpentene). The solvent was evaporated. The dry, treated poly (4 - methylpentene) was melt spun. The fibers dyed well with basic dyes.

Example 12

A polyester was prepared from the dimethyl ester of 5 - hydroxyterephthalic acid and 1,3 - cyclohexanedimethanol. Two hundred and ten g. of dimethyl 5 - hydroxyterephthalate and 180 g. of 1,3 - cyclohexanedimethanol were placed in a vessel equipped with a stirrer, an inlet for purified nitrogen and a distillation column. A solution of 0.01 g. dibutyltin diacetate in methyl alcohol was added as catalyst. The mixture was stirred in a nitrogen atmosphere at 200° for 1 hour. The temperature was then raised to 240° and held for 30 minutes. A vacuum of 0.2 mm. was applied and stirring was continued for 15–20 minutes.

The product was a brittle glass. It had a molecular weight of about 4,000–5,000. Ten g. of the polymer and 90 g. of cellulose triacetate were dissolved in a mixture of 270 cc. methylene chloride and 30 cc. methyl alcohol. Fibers were spun from the solution by the dry spinning process. They dyed well with basic dyes and some direct cotton dyes.

Polypropylene fibers containing 12% of the polyester dyed well with basic dyes.

Polyacrylonitrile fibers containing 8% of the polyester dyed well with basic dyes.

Example 13

Using the process described in Example 12, a polyester was made from the diethyl ester 4 - hydroxyisophthalic acid and 1,4 - cyclohexanedimethanol. It had a molecular weight of 4,000–5,000. Fifteen g. of the polymer was dissolved in 150 cc. of chloroform and the solution was evaporated on 85 g. of powdered polypropylene. Fibers spun from the mixture dyed well with basic dyes.

The polyester made from 4 - hydroxyisophthalic acid and 1,4 - cyclohexanedimethanol was mixed with polycaprolactam to give a composition containing 12% by weight of the polyester. Fibers spun from the mixture dyed well with basic dyes.

Example 14

Using the method described in Example 12, a polyester was made from 0.60 mole of 4 - hydroxyisophthalic acid, 0.40 mole azelaic acid and 2,2 - dimethylpropanediol-1,3.

Acrylonitrile polymer fibers containing 10% of the polyester dyed well with basic dyes.

Fibers of poly(allylbenzene) containing 12% of the polyester dyed well with basic dyes.

Attention is directed to the fact that the polymeric polyesters of this invention as described above are not designed for use as fiber-forming polymers in themselves but find usefulness as mordants for basic and cotton dyes and acid wool dyes when used as modifiers of polymers of higher melting point, which have fiber-forming properties. In other words, the polyesters of this invention derived from a hydroxy aromatic dicarboxylic acid and a polyhydric alcohol are of too low molecular weight and melting point to be susceptible of textile fiber formation. Their chief value, in accordance with the invention, is due to the fact that they are compatible with many of the usual fiber-forming materials such as cellulose acetate of the acetone soluble variety, cellulose triacetate, polyesters, acrylonitrile polymers, polyamides and hydrocarbon polymers such as polyethylene and polypropylene and also because they are soluble in solvents commonly employed in the dry spinning and wet spinning of fiber-forming cellulose esters such as cellulose acetate of the acetone soluble variety, cellulose triacetate and other fiber-forming cellulose esters and mixed esters, examples of such solvents being acetone, methylene chloride, and various lower aliphthalic alcohols such as methyl, ethyl, propyl, isopropyl, butyl, isobutyl and amyl alcohols, and others as well as various esters such as methyl actate, ethyl acetate, isopropyl acetate, butyl acetate, ethyl butyrate and many others.

The polyesters of this invention are to be distinguished from other higher polymeric, fiber-forming polyesters such as those of Caldwell U.S. Patent 2,887,468. Specifically, the polyesters of this invention contain 30–100 mole percent, and preferably 50–70 mole percent, of the hydroxy aromatic acid in the polymer molecule, whereas the polyesters of U.S. Patent 2,887,468 contain only 5–25 mole percent of the hydroxy aromatic acid in the polymer molecule. Furthermore the polyesters of U.S. Patent 2,887,468 are fiber-forming polyesters and must have an intrinsic viscosity, as defined above, of at least .4, whereas the polyesters of the instant invention are non-fiber forming and must have an intrinsic viscosity well below .4, and preferably less than .2, which corresponds to a molecular weight of 1,500–5,000.

It has been found that especially desirable dyeing effects may be produced by the use of the polymeric polyester modifiers or mordants of the instant invention in the dyeing of a wide variety of fiber-forming materials such as acetone soluble cellulose acetate, cellulose triacetate, polyacrylonitrile, polyesters, polyamides and polyhydrocarbons such as polyethylene and polypropylene when employing the following basic dyes:

| | Colour Index |
|---|---|
| Severon Blue B | Basic Blue 21. |
| Severon Blue 2G | Basic Blue 22. |
| Severon Brilliant Red 4G | Basic Red 14. |
| Severon Green B | Basic Green 3. |
| Severon Yellow R | Basic Yellow 11. |
| Methylene Blue 2B | Basic Blue 9. |
| Methylene Violet 3RD | Basic Violet 5. |
| Methyl Violet | Basic Violet 1. |

Direct cotton dyes that are suitable include the following.

| | Colour Index No. |
|---|---|
| Solantine Black L | 27720 |
| Solantine Blue BLL | 23155 |
| Solantine Brown BRL | 30145 |
| Solantine Red 8BL | 28160 |

It will be evident from the above description of my invention that it represents a distinct advance in the art of dyeing with basic and related dyes of fibers formed from a wide variety of fiber-forming polymeric materials and has solved a long standing problem in the production of dyeable fibers from polyhydrocarbons such as polyethylene and polypropylene which have heretofore been impossible to dye satisfactorily with the type of dyes in question. It is to be noted that such polyhydrocarbon fiber-forming material may be of the amorphous or crystalline types and still produce satisfactorily dyeable fibers. The preferred fibers of this type produced in accordance with the invention are those made from the relatively high melting, crystalline polyhydrocarbons such as polypropylene, poly(4-methylpentene), poly(vinylcyclohexane), poly(allylcyclohexane), poly(allylbenzene), etc.

Although the invention has been described in considerable detail with particular reference to certain preferred embodiments thereof, variations and modifications can be effected within the spirit and scope of the invention as described hereinabove, and as defined in the appended claims.

We claim:

1. A synthetic fiber having improved susceptibility for dyeing with basic dyes, the fiber forming composition of said fiber being poly(1,4-cyclohexylenedimethylene terephthalate) said composition having dispersed therein from about 3 to about 30 percent, based on the weight of said fiber, of a linear, non-fiber-forming polyester having a molecular weight of approximately 1,500 to 5,000, said polyester consisting essentially of the condensation product of 5-hydroxyisophthalic acid and 1,4-cyclohexanedimethanol.

References Cited

UNITED STATES PATENTS

| | | | |
|---|---|---|---|
| 3,107,228 | 10/1963 | Cappuccio et al. | 260—897 |
| 2,744,086 | 5/1956 | Mowry et al. | 260—873 |
| 2,887,468 | 5/1959 | Caldwell et al. | 260—47 |
| 2,901,466 | 8/1959 | Kibler et al. | 260—75 |
| 3,047,536 | 7/1962 | Gordon | 260—47 |
| 3,137,989 | 6/1964 | Fior et al. | 260—873 |
| 3,143,526 | 8/1964 | Caldwell et al. | 260—47 |
| 2,753,373 | 7/1956 | Hutchings et al. | 260—75 |
| 2,806,057 | 9/1957 | Finch et al. | 260—75 |
| 2,882,255 | 4/1959 | Caldwell et al. | 260—45.4 |

FOREIGN PATENTS

| | | |
|---|---|---|
| 571,989 | 3/1959 | Canada. |
| 900,495 | 12/1953 | Germany. |
| 610,140 | 10/1948 | Great Britain. |

JAMES A. SEIDLECK, *Primary Examiner.*

WILLIAM H. SHORT, JOSEPH L. SCHOFER, LEON J. BERCOVITZ, D. ARNOLD, *Examiners.*